Oct. 6, 1964    R. J. LIVINGSTON    3,151,599
INDICATOR-TYPE CLOSURES
Filed April 22, 1963    3 Sheets-Sheet 1
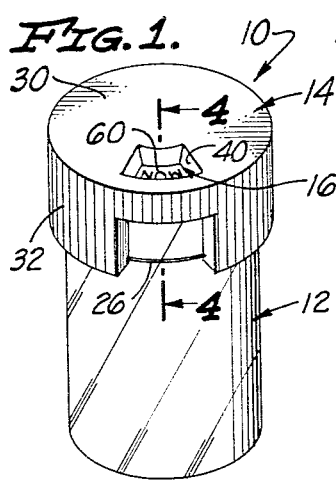
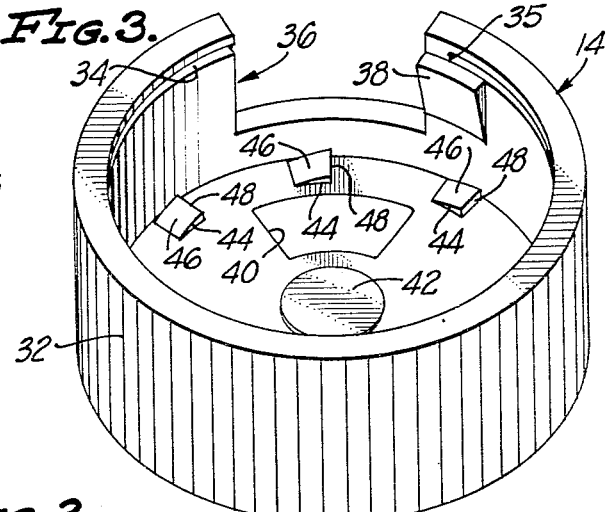
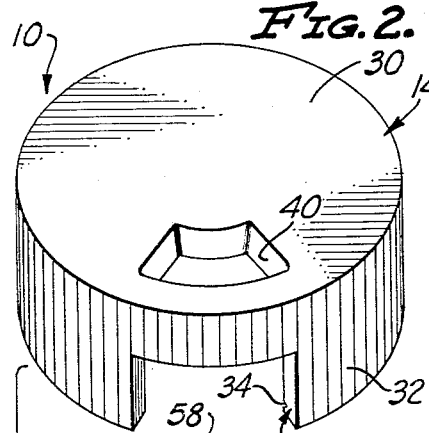
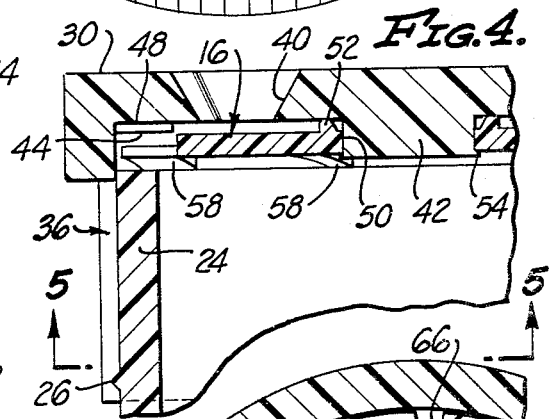
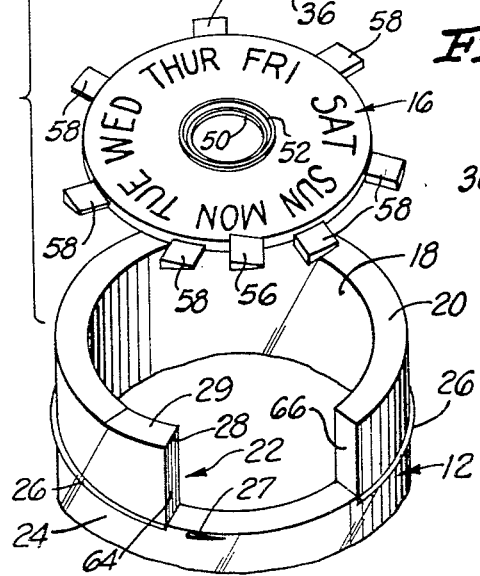
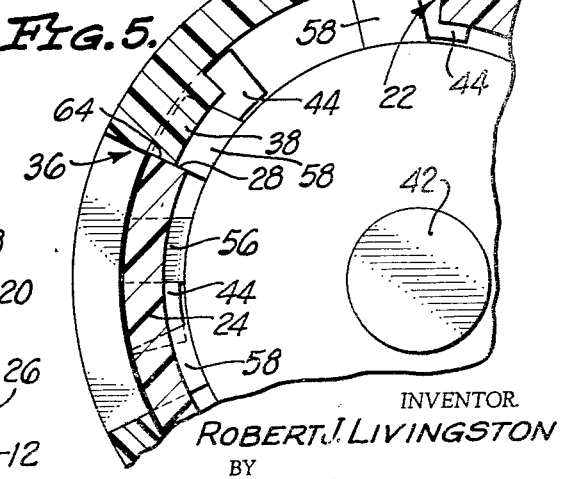
INVENTOR.
ROBERT J. LIVINGSTON
BY
EDWARD D. O'BRIAN
ATTORNEY

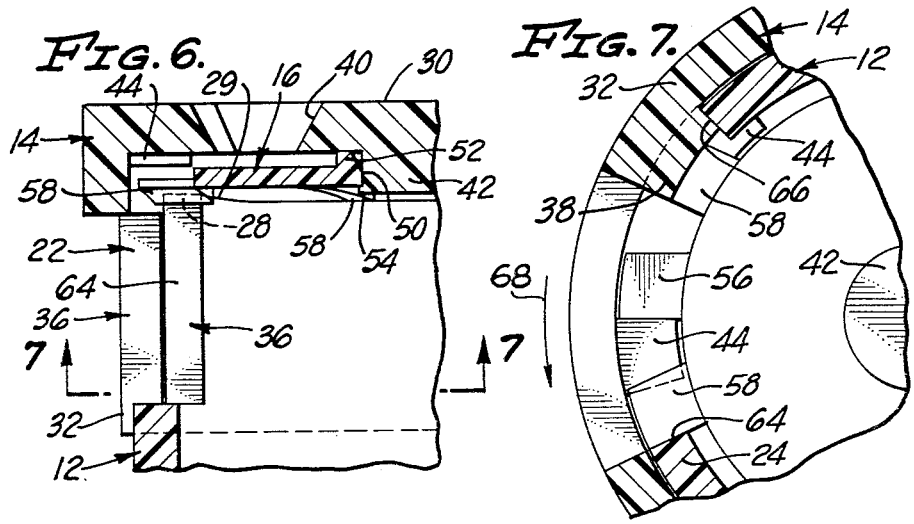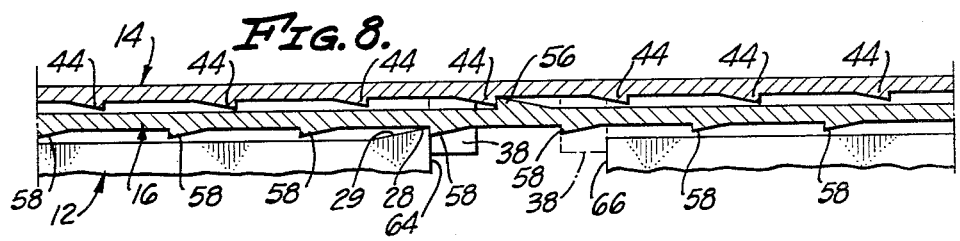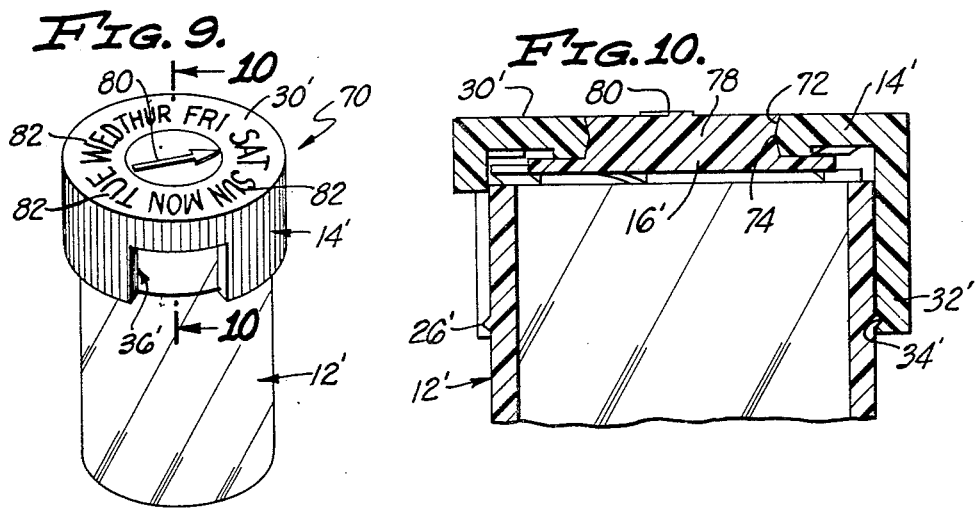

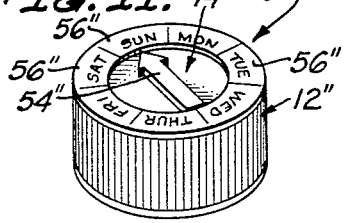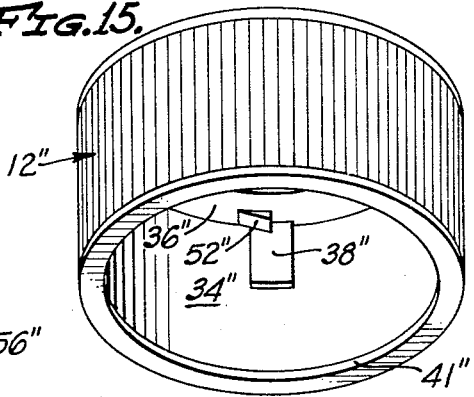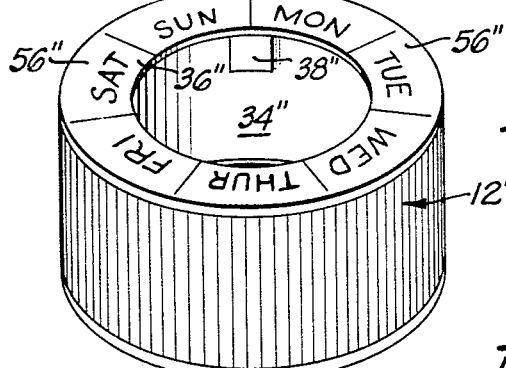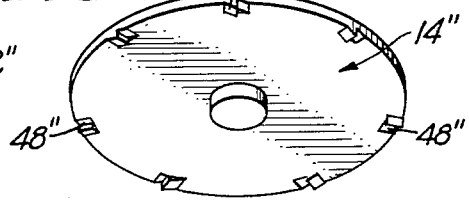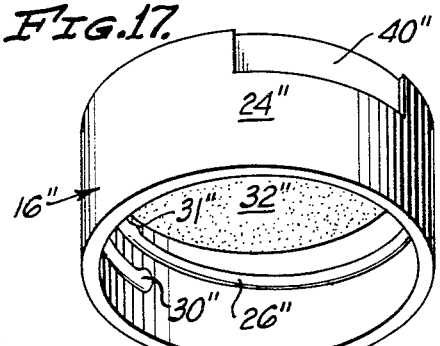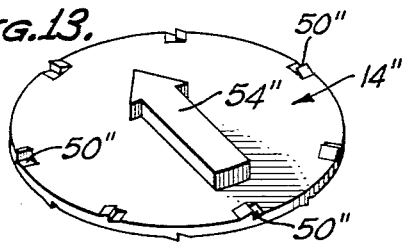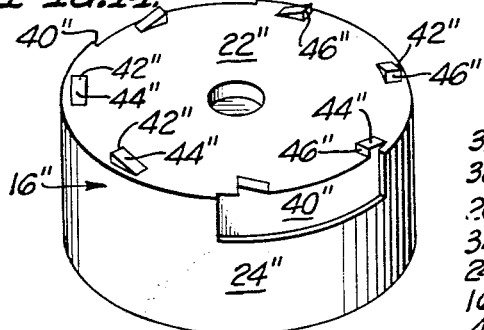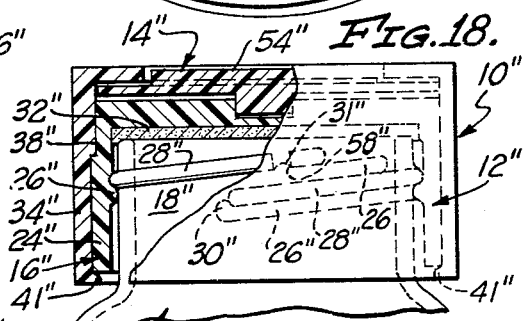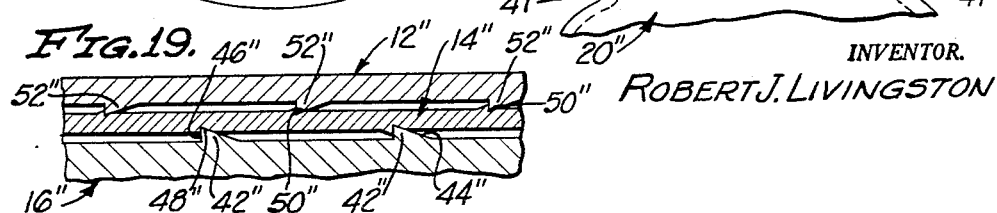

United States Patent Office 3,151,599
Patented Oct. 6, 1964

3,151,599
INDICATOR-TYPE CLOSURES
Robert J. Livingston, 13075 Blairwood Drive,
North Hollywood, Calif.
Filed Apr. 22, 1963, Ser. No. 274,692
9 Claims. (Cl. 116—121)

This invention pertains to indicator type closures which are constructed so as to include what may be referred to as a counter-type of structure. Such a counter-type of structure is used in a closure of this invention so as to indicate in sequence which is related to the number of times the closure is moved so as to open or close a container used with the closure.

An object of the present invention is to provide new and improved indicator-type closure structures in combination with a container which utilizes fewer parts. A related object of the present invention is to provide indicator-type closure structures which, because of the fact they use fewer operative parts than these prior closure structures, are less expensive to manufacture than these prior devices.

A related object of the present invention is to provide indicator-type closure structures which incorporate what may be referred to as "counter means" or "means for indicating a sequence" or "indicator means" which are actuated in accordance with the number of times a structure of this invention is moved between opened and closed positions. A further object of the present invention is to provide indicator-type closure structures which, because of the incorporation of such means, can be used to provide an accurate indication as to the utilization of various goods packaged in containers used as a part of these indicator-type closure structures.

The actual details of this invention as well as many other objects and advantages of it will be more fully apparent from a detailed consideration of the accompanying drawing in which:

FIG. 1 is a perspective view of a presently preferred indicator-type closure of this invention;

FIG. 2 is an enlarged exploded view showing various parts of this closure;

FIG. 3 is a further enlarged perspective inverted view showing the under surface of one of the parts shown in FIG. 2;

FIG. 4 is an enlarged partial cross-sectional view taken at line 4—4 of FIG. 1;

FIG. 5 is a partial cross-sectional view taken at line 5—5 of FIG. 4;

FIG. 6 is a partial cross-sectional view which is similar to FIG. 4 showing various parts of the indicator-type closure in an open position;

FIG. 7 is a partial cross-sectional view taken at line 7—7 of FIG. 6;

FIG. 8 is a diagrammatic, sectional type view illustrating the operation of the cooperating means employed in the indicator type closure shown in the preceding figures for causing a change in the relative positions of said member and said lid when said container is opened;

FIG. 9 is a perspective view of a modified indicator type closure of this invention;

FIG. 10 is a cross-sectional view taken at line 10—10 of FIG. 9;

FIG. 11 is a top perspective view of another embodiment of the indicator-closure structure of this invention;

FIG. 12 is a top perspective view on an enlarged scale of an actuator employed in this indicator-closure structure;

FIG. 13 is a top perspective view on an enlarged scale of an indicator disk employed in this indicator-closure structure;

FIG. 14 is a top perspective view of a closure member employed in this indicator-closure structure;

FIG. 15 is a bottom perspective view of the actuator shown in FIG. 12;

FIG. 16 is a bottom perspective view of the indicator disk shown in FIG. 13;

FIG. 17 is a bottom perspective view of the closure member shown in FIG. 14;

FIG. 18 is a diagrammatic view, partially in section, showing the use of the indicator-closure shown in the preceding FIGS. 11 through 17 upon the neck of a container; and FIG. 19 is a diagrammatic view showing co-action between the various parts of indicator-closure according to the latter embodiment of this invention.

The accompanying drawings are primarily intended so as to clearly illustrate two presently preferred embodiments or forms of this invention. Those skilled in the art of closure structures will realize that the basic principles or features of this invention can be embodied within a number of differently appearing devices by modifying the specific indicator-type closure structures shown through the use of routine engineering skill or ability. For this reason the present invention is to be taken as being limited by the appended claims, and not by the accompanying drawings.

As an aid to understanding this invention it can be stated in essentially summary form that it concerns indicator-type closure structures, each of which includes in combination: a container; a lid mounted on a container; a member movably mounted in a lid; indicating means for indicating a sequence formed on the member and the lid; and cooperating means formed on the container and member and formed on the member and the lid for causing relative motion between the member and the lid in accordance with movement of the lid with respect to the container in order to move the indicating means with respect to one another so as to indicate a sequence. Such sequences may be the days of the week, but other hourly or similar sequences can be incorporated within the structures shown with a minimum of difficulty.

In the initial figures of the drawings there is shown a complete indicator-type closure 10 of this invention which includes a container 12, a lid 14 and a member 16. This container 12 is formed so as to have an open top 18 surrounded by a top edge 20. A rectangular opening 22 is located in a cylindrical wall 24 of the container 12 so as to lead from this edge 20. Preferably a small flange 26 and an aligned bump 27 are formed on the exterior wall 24 so as to extend around this wall 24. The edge 20 is preferably formed so as to include a projection 28 having an inclined surface 29 lending to the edge of the opening 22 serving as a pawl as hereinafter described. This projection 28 is located immediately adjacent to the opening 22.

The lid 14 employed with the closure 10 has a conventional flat top 30 which holds a dependent cylindrical skirt 32. This skirt 32 is dimensioned so as to fit closely against the wall 24; preferably a groove 34 having a closed end 35 is formed in the interior of the skirt 32 for the purpose of engaging the flange 26 so as to prevent the lid 14 from being moved away from the container 12. The skirt 32 also preferably includes a rectangular opening 36 which is adapted to overlay the opening 22 during the use of the complete closure 10 as hereinafter described.

As the lid 14 is mounted upon the container 12 a small projection 38 on the interior of the skirt 32 adjacent to the opening 36 fits within the opening 22 in the container 12 so as to prevent this lid from being rotated with respect to the container 12 in such a manner that the opening 36 is located remote from the opening 22.

Within the top 30 of the lid 14 there is formed a small window like opening 40. This top 30 also includes on its inner surface a centrally located generally cylindrical bearing boss 42 which is located centrally with respect to the skirt 32.

The top 30 also holds a plurality of ratchet like projections 44 so that these projections are immediately adjacent to the skirt 32 in the area of the top 30 directly opposite the edge 20 when the lid 14 is in place. These projections 44 are all identically formed and are located equi-distant from one another. Each of the projections 44 has a sloping surface 46 and an end surface 48 extending perpendicular to the top 30.

The member 16 is of a washer like shape and includes a central opening 50 surrounded by a spacing flange 52. This opening 50 is designed so that the member 16 may be rotatably mounted upon the boss 42 by being slid over this boss. In this position the flange 52 spaces the principal parts of the member 16 a comparatively short distance away from the top 30 by engaging this top. If desired a small holding flange 54 may be located on the extremity of the boss 42 so as to prevent the member 16 from slipping off of this boss.

The member 16 preferably includes a single projection 56 which is secured to its periphery so as to face and be in contact with the projections 44 previously described. If desired, a plurality of these projections 56 may be used although this is not normally necessary. The member 16 also includes a plurality of other projections 58 which correspond in number to the number of projections 44 employed. The projections 56 and 58 all are formed in the same manner as the projections 44 so as to include sloping surfaces 46 and end surfaces 48. However, the projections 56 and 58 are constructed so as to face the opposite direction of rotation around the axis of the skirt 32 from the direction of the projections 44.

When seven of the projections 44 are used on the closure 10 preferably the member 16 carries indicia 60 designating various days of the week. The projections 28, 44, 56 and 58 serve in this closure 10 as cooperating means serving to rotate the member 16 so that successive of the indicia 60 can be viewed through the window like opening 40 as the closure 10 is used. From this it will be apparent that the indicia 60 and the window like opening 40 can be considered as cooperating indicating means of a type for indicating successive increments of relative motion between the lid 14 and the member 16.

When the lid 14 is in a closed position the projection 38 rests against an edge 64 of the opening 22. When the lid 14 is twisted with respect to the container 12 so as to be moved to an open position the one of the projections 44 in contact with the projection 56 will transmit the rotation of the lid 14 to the member 16, causing this member to simultaneously rotate. As this rotation of the member 16 occurs the projections 58 will move with respect to the projection 28 so as to locate a new projection 58 in engagement with the projection 28. Such rotation of the lid 14 with respect to the container 12 is limited by the projection 38 hitting against an edge 66 of the opening 22 which is opposite the edge 64. When in the open position with the projection 38 against the edge 66 the openings 22 and 36 are in alignment with one another, and whatever is located within the interior of the container 12 can be removed from it.

When it is necessary to close the closure 10 the lid 14 is rotated in a reverse direction as indicated by the arrow 68 in FIG. 7. As this occurs rotation of the member 16 is prevented by means of engagement of the projection 28 with the adjacent projection 58. Thus, during closing the member 16 remains stationary while the lid 14 rotates with respect to it so as to move the window like opening 40 over a previously covered one of the indicia 60. The rotation during the closing will, of course, be limited by the projection 38 hitting against the edge 64 of the opening 22.

The purpose of the bump 27 in the closure 10 is to "lock" or provide sufficient friction to hold the lid 14 in a closed position with the closed end 35 fitting between this bump 27 and the flange 26. When the lid 14 is moved to an open position from a closed position the end 35 moves past the bump 27; when it is moved to a closed position from an open position it moves past this bump 27.

From the aforegoing it will be apparent how the projections 28, 44, 56 and 58 serve as cooperating means for causing a change of the relative positions of the member 16 and the lid 14 each time this lid 14 is moved in order to cover and uncover the opening 36 in the container 12. It will also be apparent that in effect there are two sets of these cooperating means: the projections 44 and 56 which permit rotation between the lid 14 and the member 16 in one direction, and the projections 28 and 58 which permit rotation of the member 16 with respect to the container 12 in the opposite direction, but which prevent rotation in opposite of these directions. In effect, the projection 28 and the projection 56 in the closure 10 serve as pawls which cooperates with the projections 44 and 58, respectively, when these latter projections serve as ratchets.

This ratchet and pawl type action obtained in the closure 10 is related to the relative flexibility of the member 16 and of the projections 56 and 58 formed on it. The necessary flexibility for the operation of the closure 10 can be obtained by forming the member 16 out of virtually any convenient material such as flexible sheet metal or the like. It is presently preferred however to manufacture this member 16 out of a somewhat resilient plastic material such as polystyrene, linear polyethylene or the like. The member 16 can be conveniently snapped into place when the lid 14 is formed out of a similar material. Further, when formed out of such material this lid 14 may be conveniently snapped into place upon the container 12. This container 12 is preferably manufactured from a transparent material so as to enable its contents to be inspected.

In constructing the closure 10 so that the indicia 60 corresponds to the seven days of the week, it is necessary to proportion the opening 36 so that this opening extends one-seventh of the distance around the axis of the skirt 32 and to form the opening 22 so that it extends the same amount around this axis plus an amount corresponding to the dimensions of the projection 38. In forming the closure 10 so that the indicia 60 correspond to any even numbered sequence, the widths of these openings 22 and 32 are proportioned as indicated herein so that the opening 36 corresponds to a fractional proportion of the distance around the axis of the skirt 32 obtained by dividing 360° by the number of indicia 60 to be used. In any case the number of projections 44 and 58 must correspond to the number of such indicia.

In FIGS. 9 and 10 of the drawings there is shown a modified indicator type closure 70 of the present invention which is essentially the same as the closure 10 previously described. For convenience of explanation those parts of the closure 70 which are identical to or substantially identical to corresponding parts of the closure 10 are not separately described in this specification and are set forth in the accompanying drawings and in the remainder of this specification by the primes of the numerals previously used to describe such parts.

In the closure 70 the boss 22 is replaced by a circular opening 72 having a centrally located constriction 74. In this closure 70 of the member 16' is not provided with the opening 50 previously described but is provided with a boss 78 which is adapted to be fitted within the opening 72 so as to rotatably hold the member 16' with respect to the lid 14'. This boss 78 preferably carries a pointer 80 which is adapted to point to any of a series of indicia 82 corresponding to the indicia 60. These indicia 82 are located on the top 30' of the lid 14'.

A further embodiment of this invention is shown in FIGS. 11 through 19. An indicator-closure 10″ of the present invention which includes an actuator 12″ as shown in FIGS. 12 and 15, an indicating disk 14″ as shown in FIGS. 13 and 16, and a closure 16″ as shown in FIGS. 14 and 17. These three parts are, of course, all formed so as to include various individual features or parts which cooperate together as hereinafter explained. The closure 16″ is formed so as to be capable of forming a seal about a threaded neck 18″ on a container 20″ which is shown in FIG. 18 of the drawings.

The closure 16″ is formed so as to include a disk-like top 22″ to the edge of which there is attached a cylindrical skirt 24″. This skirt 24″ includes internal threads 26″ which are adapted to mate with corresponding threads 28″ on the neck 18″. An enlarged head 30″ is located at the "lead end" of the threads 26″ for a purpose as hereinafter explained. If desired other heads 31″ in the nature of enlargements may also be located on the threads 26″ for this hereinafter explained purpose. Within the skirt 24″ and against the top 22″ there preferably is located a sealing disk 32″ of cork, resilient treated paper, polyethylene or the like for the purpose of abutting against a neck such as the neck 18″ so as to form a seal when the complete indicator-closure 10″ is used for its intended purpose. In effect, the sealing disk 32″ forms a part of the closure member 16″ in the complete indicator-structure 10″.

The actuator 12″ used in the indicator-closure 10″ includes a cylindrical skirt 34″ of slightly larger diameter than the skirt 24″. This skirt 34″ fits closely adjacent to the exterior of the skirt 24″. At the upper extremity of the skirt 34″ there is located an inwardly extending annular flange 36″ which is located so as to extend generally parallel to the top 22″. This flange 36″ is employed so as to hold the indicating disk 14″ in place upon the top 22″ of the closure 16″.

The actuator 12″ is retained upon the closure 16″ through the use of at least one projection 38″ formed upon the interior of the skirt 34″. In the structure 10″ a plurality of projections 38″ are spaced equi-distant from one another. Each of the projections 38″ utilized fits within an elongated slot 40″ formed upon the exterior of the skirt 24″ forming a part of the closure 16″. These slots 40″ in the structure 10″ are formed substantially identically and spaced equi-distant from one another and are proportioned as to length as hereinafter described. The slots 40″ are designed so that during the use of the complete indicator-closure 10″ the actuator 12″ is capable of being turned so that the projections 38″ fit against the ends of the slots 40″ in order to cause rotation of the closure member 16″. Such rotation of the closure 16″ is necessary to attach the complete indicator-closure 10″ to a neck of a container, such as the neck 18″, or to remove it therefrom. With the indicator-closure 10″ an annular lip 41″ on the bottom of the skirt 34″ prevents the actuator 12″ from coming off of the closure 16″ by engaging the skirt 24″.

The closure-indicator structure 10″ includes two ratchet means, the first comprising the notches 50″ and the protrusions 52″, and the second comprising the notches 48″ and the protrusions 42″, as hereinafter described. In the indicator-closure 10″ shown in the drawings a plurality of identical pawl-like protrusions 42″ are spaced equi-distant from one another around the periphery of the top 22″ of the closure 16″. Each of these protrusions 42″ includes a sloping wall 44″ leading to the terminus of an upright wall 46″ which leads perpendicularly away from the top 22″. The protrusions 42″ are adapted to fit within the correspondingly shaped notches 48″, formed in the disk 14″ which are directly opposite them. Other notches 50″ of a similar character are formed in the surface of the disk 14″ directly opposite the flange 36″. These other notches 50″ are adapted to be engaged by the protrusions 52″ formed on the interior of the flange 36″ so as to face the disk 14″ and the top 22″ of the closure 16″.

The notches 48″ and 50″ formed on the disk 14″ are spaced in the same manner as the protrusions 42″ and 52″, so that the relative spacing of the notches 50″ and the corresponding protrusions 52″, comprising the first ratchet means, and the notches 48″ and the corresponding protrusions 42″, comprising the second ratchet means, are all the same. In the operation of the complete indicator-closure structure 10″ the protrusions 42″ and the notches 48″ act so as to permit rotation in only one direction, and the notches 50″ and the protrusions 52″ serve the same purposes.

The significance of these ratchet means (notches 48″ and protrusions 42″, and the notches 50″ and protrusions 52″) is apparent from consideration of the manner in which the visible portions of the complete indicator-closure 10″ are viewed. In the particular indicator-closure structure 10″ the visible surface of the disk 14″ includes an enlarged arrow or similar indicia 54″ which normally is located so as to point to the center of any one of a plurality of different segments 56″ marked off by appropriate indicia on the visible portion of the flange 36″.

In the particular structure 10″ seven of these segments 56″ are used, each one of them designating a day of the week. When this number of segments 56″ is utilized in the complete indicator-closure 10″ the corresponding number of protrusions 42″ and 52″ and notches 48″ and 50″ may be employed. These ratchet means are spaced in such a manner that during the operation of the indicator-closure structure 10″ the arrow 54″ is located so as to point at the center of any one of the segments 56″. Preferably the arrow 54″ is raised slightly from the plane of the disk 14″ so as to facilitate its being directly engaged for manual rotation when desired.

When the complete indicator-closure 10″ is to be located upon the neck 18″ of the container 20″ or upon a similar structure, the actuator 12″ is engaged and the complete closure 10″ is located so that the closure 16″ fits over the neck 18″. Then the actuator 12″ is rotated (in a clockwise manner when the threads 26″ and 28″ are formed as shown). Such rotation causes the projections 38″ to slide within the slots 40″ until they hit against ends of these slots. The slots 40″ are proportioned so that the extent of this rotary movement of the projections 38″ within the slots 40″ corresponds to the rotary spacing of one segment 56″ from the next adjacent segment.

An important feature of the complete indicator-closure structure 10″ is the action achieved by the ratchet means consisting of the notches 50″ and the protrusions 52″ during this process of locating this structure 10″ upon the neck 18″. As this occurs the protrusions 52″ engaged the notches 50″ in the disk 14″ so as to advance the disk 14″, thereby changing the location of the arrow 54″ from opposite one segment to opposite the next adjacent segment.

As the clockwise rotation is carried out the head 30″ is temporarily deformed to some slight extent, enabling the threads 26″ and 28″ to mate with one another. As the rotation continues the complete indicator-closure 10″ is tightened down upon the neck 18″ and the sealing disk 32″ is compressed to a moderate extent. When the complete indicator-closure 10″ is tightened to the desired extent the head 30″ will extend past an end of the thread 28″ on the neck 18″, and will "snap" around the end of this thread 28″. This provides a type of locking action which prevents accidental dislodgement of the complete indicator-closure 10″ and insures that this structure 10″ is tightened down to the desired extent. As the head 30″ assumes this closed position the pressure against the sealing disk 32″ is considered to be released only to a slight extent which is insufficient to destroy the seal between it and neck 18″.

If the heads 31″ are used they will also "snap" into breaks or notches 58″ in the threads 28″ on the neck 18″ so as to achieve the locking action explained in the preceding paragraph. For this "snapping" type of holding action to be achieved at least either the threads 26″ or 28″ or the seals 32″ must be somewhat resilient.

When it is desired to release the indicator-closure structure 10″ from the neck 18″ the actuator 12″ is rotated (in a counter-clockwise manner when the threads 26″ and 28″ are formed as shown) until such time as the projections 38″ abut against the ends of the slots 40″. As this occurs, relative motion between the disk 14″ and the closure 16″ is prevented by the ratchet means consisting of the protrusions 42″ and notches 48″, while the ratchet means consisting of the notches 50″ and the protrusions 52″, permit the actuator 12″ to move with respect to the disk 14″ sufficiently so that upon the actuator 12″ being rotated clockwise the disk 14″ will be advanced as described above. As the actuator 12″ continues to be turned counter-clockwise, the projections 38″ abutting against the ends of the slots 40″ cause rotation of the closure 16″, which rotation of the closure 16″ causes the head 30″ to snap past the end of the threads 28″, thereby releasing the locking action between the threads 26″ and 28″ and allowing the complete structure 10″ to be removed from the neck 18″ upon further counter-clockwise rotation.

Thereafter, when the complete indicator-closure structure 10″ is again located upon a container 20″ as previously described, the ratchet means consisting of the notches 50″ and the protrusions 52″ will permit the disk 14″ to rotate with respect to the closure 16″ so as to change the relative positions of the indicia 54″ and the segments 56″. Thus, each time this indicator-closure 10″ is tightened down upon a neck such as the neck 18″, the arrow or other indicia means is in effect "advanced" from one of the segments 56″ to the next, so as to indicate a time sequence for the use of the contents of the container.

Because of the construction of the ratchet means consisting of protrusions 42″ and the notches 48″, the arrow 54″ may be engaged at any time by hand or by an appropriate implement so as to rotate the disk 14″ in a clockwise manner in order to "pre-set" the arrow 54″ to indicate any one specific segment of the segments 56″. Thus, when the indicator-closure structure 10″ is first used it may be "set" to indicate the appropriate starting point of a time sequence for the use of the contents of the container 20″.

Although the actuator 12″, the disk 14″ and the closure 16″ can be inexpensively formed out of many different materials using known techniques and processes, it is normally preferred to form each of these parts out of a material having a limited degree of resiliency. Such materials are desirable since they permit easy assembly of the structure 10″ and since the actuator 12″, the disk 14″ and the closure 16″ are considered to be capable of performing most satisfactorily if somewhat resilient. Suitable materials of the type preferred are known in thermoplastic compositions such as polyethylene, polypropylene and the like. Other similar and related materials can, of course, be employed in the indicator-closure 10″.

The particular type of time sequence illustrated by the segments 56″ is considered to be particularly desirable when indicator-closures as herein described are used for such purposes as regulating or controlling the consumption of drugs of various types which are taken daily. If desired, different sequences than that shown can be employed with this invention; in essence, the indicia located on the actuator 12″ and the disk 14″ (that is, the arrow 54″ and the segments 56″) define the "read-out" parts of a counter structure, even though in a particular embodiment of the invention illustrated these parts are not used to count a conventional numerical sequence.

Obviously the relative positions of the segments 56″ and the arrow 54″ can be altered in the structure shown so that the segments 56″ are located upon the disk 14″ and the arrow 54″ is located upon the flange 36″ without affecting the manner in which the indicator-closure 10″ is operative. A number of other similar changes of a routine engineering or design nature may be made in the structure shown. Thus, for example, a wide variety of different known ratchet-type structures can be utilized instead of the particular ratchet means illustrated. Similarly the relative positions of the projections 38″ and the slots 40″, may be interchanged without affecting the basic manner in which indicator-closures as herein described operate. Also various different known continuous and discontinuous threads, or similar structures such as bayonet type connection parts, can be formed on the closure 16″ for engagement with a container.

This application is related to the co-pending application Serial No. 111,792 filed May 22, 1961, and entitled Closure Structures, now abandoned. This application is a continuation in part of the co-pending application Serial No. 156,860 filed December 4, 1961, and entitled Indicator Type Closures, now abandoned. The entire disclosures of these applications are incorporated in this new application by reference as though set out in full.

I claim:
1. An indicator-type closure which comprises:
   a first member having an opening formed therein;
   a lid movably mounted on said first member so as to be capable of being moved with respect to said first member in order to cover and uncover said opening;
   a second member movably mounted on said lid adjacent to said lid;
   indicating means for indicating successive relative movement between said lid and said second member; and
   cooperating means on said first member, said lid and said second member for causing a change in the relative position of said indicating means from one increment to the next increment each time said lid is moved with respect to said first member in order to cover and uncover said opening; said cooperating means comprising two sets of separate cooperating means, one of said sets being formed so that part thereof is on said lid and another part thereof is formed on said second member, the other of said sets being formed so that a part thereof is on said second member and another part thereof is on said first member.

2. An indicator-type closure as defined in claim 1 wherein each of said sets is formed so that one part thereof is a series of ratchet notches and so that the other part thereof is a pawl capable of engaging any of the ratchet notches of the other of said parts.

3. An indicator-type closure which comprises:
   a first member having an opening formed therein;
   a lid movably mounted on said first member so as to be capable of being moved with respect to said first member in order to cover and uncover said opening;
   a second member movably mounted on said lid adjacent to said lid;
   indicating means for indicating successive increments of relative movement between said lid and said second member located on said lid and said second member, said indicating means comprising cooperating means on said lid and said second member for indicating successive increments of a series; and
   cooperating means on said first member, said lid and said second member for causing a change in the relative position of said second member and said lid from one of said increments to the next of said increments each time said lid is moved with respect to said first member in order to cover and uncover said opening.

4. An indicator-type closure which comprises in combination: a container having an end; a lid rotatably mounted on said end of said container; a member rotatably mounted on said lid; cooperating indicating means for indicating a sequence formed on said member and said lid, said indicating means being visible; first cooperating ratchet means formed on said container and said member, and second cooperating ratchet means formed on said lid and said member, both of said cooperating ratchet means being responsive to rotation of said lid with respect to said container in order to cause relative movement between said cooperating indicating means in order to indicate a sequence in accordance with said lid being turned with respect to said container.

5. An indicator-type closure as defined in claim 4 including cooperating means for limiting rotation of said lid with respect to said container formed on said lid and on said container so as to limit movement of said lid with respect to said container so that said cooperating indicating means are capable of indicating only a single step of a sequence each time said lid is rotated in a single direction with respect to said container.

6. An indicator-type closure as defined in claim 5 wherein said lid is permanently mounted on said container and wherein said lid and said container contain openings which are aligned with one another in an open position of said lid and which are separated from one another in a closed position of said lid.

7. In combination: a container having an end, said end being formed so as to include a plurality of ratchet notches located in a circular path; a lid positioned on said container, said lid being capable of being rotated and being formed so as to include a plurality of ratchet notches located in a circular path; a member rotatably mounted generally between said lid and said container, said member having a plurality of resilient pawls formed thereon, at least one of said pawls extending from said member so as to be capable of engaging said ratchet notches in said container, and other of said pawls extending from said member so as to be capable of engaging said ratchet notches in said lid; and first indicating means formed on said member and second indicating means formed on said lid, said indicatnig means being movable with respect to one another when said lid is turned with respect to said container by the action of said resilient pawls on said member engaging said ratchet notches on said container and said lid.

8. An indicator-type closure as defined in claim 7 including cooperating means for limiting rotation of said lid with respect to said container formed on said lid and on said container so as to limit movement of said lid with respect to said container so that said cooperating indicating means are capable of indicating only a single step of a sequence each time said lid is rotated in a single direction with respect to said container.

9. An indicator-type closure as defined in claim 7 wherein said lid is permanently mounted on said container and wherein said lid and said container contain openings which are aligned with one another in an open position of said lid and which are separated from one another in a closed position of said lid.

References Cited in the file of this patent
UNITED STATES PATENTS

| | | |
|---|---|---|
| 2,587,147 | Guion et al. | Feb. 26, 1952 |
| 2,939,597 | Greene | June 7, 1960 |
| 2,943,730 | Tregilgas | July 5, 1960 |